(12) United States Patent
Kuntz et al.

(10) Patent No.: US 9,987,770 B2
(45) Date of Patent: Jun. 5, 2018

(54) DEVICE FOR SHAPING A WORKPIECE

(75) Inventors: Julian Kuntz, Augsburg (DE); Franz Stadler, Boehmfeld (DE)

(73) Assignee: EADS Deutschland GmbH, Ottobrunn (DE)

( * ) Notice: Subject to any disclaimer, the term of this patent is extended or adjusted under 35 U.S.C. 154(b) by 386 days.

(21) Appl. No.: 13/318,856

(22) PCT Filed: May 6, 2010

(86) PCT No.: PCT/DE2010/000511
§ 371 (c)(1),
(2), (4) Date: Jan. 10, 2012

(87) PCT Pub. No.: WO2010/127667
PCT Pub. Date: Nov. 11, 2010

(65) Prior Publication Data
US 2012/0119060 A1    May 17, 2012

(30) Foreign Application Priority Data

May 7, 2009    (DE) .................. 10 2009 020 190

(51) Int. Cl.
*B29C 33/38* (2006.01)
*B29C 43/02* (2006.01)
(Continued)

(52) U.S. Cl.
CPC .......... *B29C 33/38* (2013.01); *B29C 33/3842* (2013.01); *B29C 43/027* (2013.01); *B29C 43/10* (2013.01); *B29C 43/52* (2013.01); *B29C 33/00* (2013.01); *B29C 2033/385* (2013.01); *B29C 2043/3261* (2013.01); *B29K 2105/06* (2013.01);
(Continued)

(58) Field of Classification Search
CPC ... B29C 33/38; B29C 33/3842; B29C 43/027; B29C 43/10; B29C 43/52; B29C 2033/385; B29C 2043/3261
USPC ........ 249/80, 114.1–116, 134, 135; 425/403, 425/470; 264/240, 241, 310, 319, 327, 264/337; 427/133, 135
See application file for complete search history.

(56) References Cited

U.S. PATENT DOCUMENTS 3,387,333 A * 6/1968 Irvine et al. .................. 425/404
4,984,976 A   1/1991 Kozachevsky et al.
(Continued)

FOREIGN PATENT DOCUMENTS

CN         87 1 00101 A        10/1987
DE     10 2004 039 505 A1      6/2005
(Continued)

OTHER PUBLICATIONS

Translation of DE 102004039505.*
(Continued)

*Primary Examiner* — Alison L Hindenlang
*Assistant Examiner* — Emmanuel S Luk
(74) *Attorney, Agent, or Firm* — Crowell & Moring LLP

(57) ABSTRACT

A device for shaping a workpiece is provided. The device includes at least one first and one second component between which the workpiece to be shaped can be molded under the effect of heat. The design and/or the material properties of the first and/or the second component are selected such that the component's thermal expansion is different in different directions.

9 Claims, 1 Drawing Sheet

Figure 1:
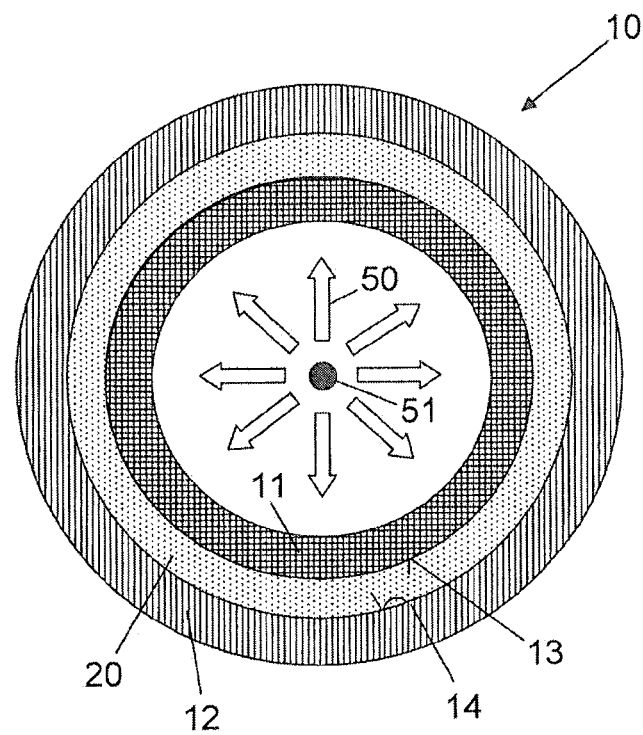

(51) Int. Cl.
    B29C 43/10      (2006.01)
    B29C 43/52      (2006.01)
    B29C 33/00      (2006.01)
    B29C 43/32      (2006.01)
    B29K 105/06     (2006.01)
    B29K 105/08     (2006.01)
    B29K 105/00     (2006.01)
    B29L 23/00      (2006.01)

(52) U.S. Cl.
    CPC ............. *B29K 2105/0854* (2013.01); *B29K 2105/253* (2013.01); *B29L 2023/00* (2013.01)

(56) References Cited

U.S. PATENT DOCUMENTS

| | | | | |
|---|---|---|---|---|
| 5,073,589 | A * | 12/1991 | Milovich et al. | 524/439 |
| 5,116,218 | A * | 5/1992 | Jourdain et al. | 425/547 |
| 5,387,098 | A * | 2/1995 | Willden | 425/393 |
| 5,817,269 | A * | 10/1998 | Younie et al. | 264/258 |
| 6,007,894 | A * | 12/1999 | Barnes et al. | 428/120 |
| 6,174,484 | B1 * | 1/2001 | Thompson et al. | 264/314 |
| 2005/0023727 | A1 * | 2/2005 | Sampson | 264/257 |
| 2008/0087793 | A1 * | 4/2008 | Shepheard | 249/80 |
| 2008/0233342 | A1 * | 9/2008 | Birrell | 428/114 |
| 2009/0001630 | A1 * | 1/2009 | Astwood et al. | 264/231 |
| 2010/0062099 | A1 * | 3/2010 | Funke et al. | 425/446 |
| 2010/0140448 | A1 * | 6/2010 | Koerwien | 249/78 |

FOREIGN PATENT DOCUMENTS

| | | | | |
|---|---|---|---|---|
| DE | 102004039505 A1 * | 6/2005 | | C08J 5/04 |
| DE | 102004042422 A1 * | 3/2006 | | B29C 33/02 |
| DE | 102006057640 A1 * | 6/2008 | | B29C 33/38 |
| DE | 10 2007 062 082 A1 | 7/2009 | | |
| EP | 0 233 134 A1 | 8/1987 | | |
| EP | 0 415 207 A2 | 3/1991 | | |
| EP | 0415207 A2 * | 3/1991 | | B29C 67/14 |
| EP | 0 439 972 B1 | 8/1991 | | |
| EP | 1 000 725 A1 | 5/2000 | | |
| JP | 04279331 A * | 10/1992 | | B32B 17/04 |
| WO | WO 00/54949 A2 * | 9/2000 | | B29C 33/00 |
| WO | WO 02/02298 A1 | 1/2002 | | |

OTHER PUBLICATIONS

Translation of DE 102004042422.*
Machine Translation of JP 04-279331.*
Corresponding International Search Report with English Translation dated Nov. 16, 2010 (seven (7) pages).
Form PCT/ISA/237 (six (6) pages).
Chinese Office Action dated Oct. 14, 2013 w/ English translation (Sixteen (16) pages).

* cited by examiner

DEVICE FOR SHAPING A WORKPIECE

BACKGROUND AND SUMMARY OF THE INVENTION

The invention relates to a device for shaping a workpiece comprising at least one first and one second component between which the workpiece to be shaped can be molded while being heated.

A device for shaping a workpiece expands uniformly in all directions under the influence of the temperature during curing of the workpiece. If the workpiece is produced from a composite material, in particular a fiber reinforced composite, forces or relative displacements can act on the workpiece that impair the quality of the workpiece. Such an impairment can be caused, for example, by fiber warpage. Moreover, the uniform thermal expansion of the components of the device results, in some cases, in the dimensional stability of the workpiece to be produced lying outside of the specified tolerances.

Accordingly, exemplary embodiments of the present invention are directed to a device for shaping a workpiece by means of which device, the quality of the produced workpieces can be improved.

Exemplary embodiments of the present invention provide a device for shaping a workpiece comprising a first and a second component between which the workpiece to be shaped can be molded under the effect of heat. The device is arranged so the its design and the material properties of the first and/or the second component are selected such that the thermal expansion of the component is different in different directions.

By providing a device with directed thermal expansion, it is possible during production to mold workpieces, which are formed from fiber reinforced composites, in a certain direction. Accordingly, forces or relative displacements in a different undesired direction that would cause an impairment of the workpiece to be manufactured can be eliminated. It is possible to avoid fiber bonding in the workpiece to be manufactured. The result of a workpiece manufactured in a device according to the invention is that the quality of the workpiece is improved with respect to fiber orientation and dimensional stability. Furthermore, the device according to the invention makes it possible to manufacture and demold geometries which cannot be manufactured by using a conventional device with non-directed thermal expansion behavior of the components of the device.

Expediently, the first and/or second component, which expands differently in different directions, comprises layers of different composites, in particular fiber reinforced composites with different thermal expansion coefficients. These layers are preferably arranged with respect to each other and/or connected to each other in such a manner that thermal expansion takes place in one or a plurality of preferred directions. This means connecting the layers avoids or at least minimizes a thermal expansion of the respective component in other directions. Moreover, the layers are arranged with respect to each other and/or connected to each other in such a manner that with the application of heat, the extent of the thermal expansion is determined. Hereby, the forces acting during molding on the workpiece can be optimized specifically with respect to dimensional stability and fiber orientation, provided the workpiece is manufactured from a fiber reinforced composite.

According to a further configuration, the first and/or second component, which expands differently in different directions, comprises at least one layer of carbon fiber reinforced plastic and at least one layer of glass fiber reinforced plastic. In this connection it is particularly useful if the fibers of the at least one layer of carbon reinforced plastic and the fibers of the at least one layer of glass fiber reinforced plastic are not arranged parallel to each other. Due to the structure of the device from different (reinforcing) materials with different thermal expansion coefficients, the thermal expansion and the extent of the thermal expansion can be set specifically in different directions. It is useful here if the fibers of the at least one layer of carbon fiber reinforced plastic and the fibers of the at least one layer of glass fiber reinforced plastic are oriented with respect to each other at an angle of approximately 90°. Accordingly, the thermal expansion can be supported in one direction and can be minimized or prevented in a direction perpendicular thereto.

In a particular configuration of the present invention, the composite comprises two layers of carbon reinforced plastic between which two layers of glass fiber reinforced plastic are arranged, wherein all layers are connected to each other in a firmly bonding and/or form-locking manner. The fiber orientation in the layers of carbon fiber reinforced plastic and glass fiber reinforced plastic relative to each other can vary depending on the shape of the workpiece to be produced. A preferred orientation is 90° relative to each other.

According to a further useful configuration, the first and the second component of the device are arranged concentrically to each other, wherein the workpiece to be shaped is arranged between an outer circumferential surface of the first component and an inner circumferential surface of the second component. Here, the design and/or the material properties of the first component are selected such that the thermal expansion of said component is different in different directions and the second component has the same thermal expansion in the different directions. Accordingly, the workpiece to be produced is molded between the first and the second component without a movement in a (longitudinal) direction occurring. Expediently, for this purpose, the first and the second component are formed cylindrically, whereby the workpiece is uniformly subjected to force. The components do not necessarily have to be cylindrical, the cross-sections can also be oval, rectangular, etc.

In particular, it is provided in this particular configuration that under the effect of heat, the first component has a thermal expansion in the circumferential direction. In contrast to that, the first component has no expansion in the axial direction under the effect of heat. This ensures the molding between the first and the second component without a movement in the axial or longitudinal direction taking place.

In this concrete configuration, the second component is formed from a homogenous material or material compound. It is useful here if under the effect of heat, the second component has approximately the same thermal expansion in the circumferential direction and the axial direction. Hereby, the force required for molding the molded part can be built up between the first and the second component.

The device according to the invention is in particular used for producing a workpiece made from a composite, in particular a fiber reinforced composite.

BRIEF DESCRIPTION OF THE DRAWING FIGURES

Figure 2:
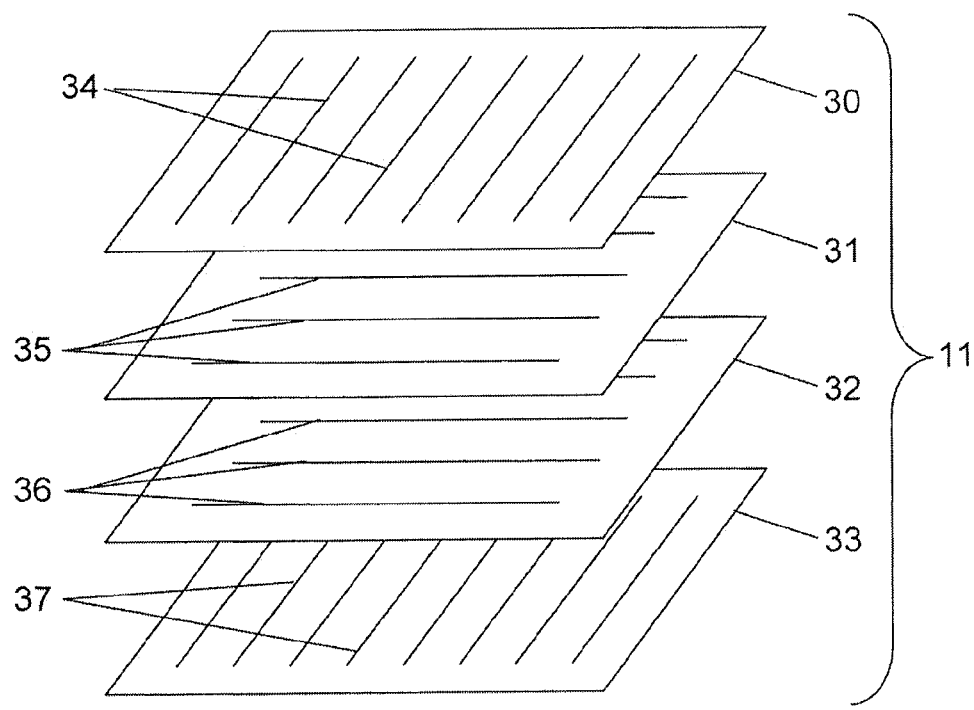

The invention is explained in more detail hereinafter by means of an exemplary embodiment. In the figures:

FIG. 1 shows a schematic cross-sectional view of a device according to the invention for shaping a workpiece, and FIG. 2 shows an exemplary, basic illustration of the structure of a first component of the device according to the invention.

DETAILED DESCRIPTION

FIG. 1 shows, in a schematic cross-sectional illustration, a device 10 according to the invention for shaping a workpiece 20. The device 10 has an inner first component 11 and an outer second component 12. Between an outer circumferential surface 13 of the first component 11 and an inner circumferential surface 14 of the second component 12, a workpiece 20 formed from a fiber composite, is arranged which is to be shaped under the influence of temperature. The first and the second component 11, 12 are exemplary formed cylindrically and are arranged concentric to each other. The first and the second component 11, 12 extend perpendicular to the sheet plane in an axial direction 51.

At least one of the two components 11, 12 of a device according to the invention is configured such that due to the design and/or the material properties, the device has, in different directions, a different thermal expansion. In the exemplary embodiment described here, the first component 11 is configured such that, when heated, it has a thermal expansion in the circumferential direction 50, but no thermal expansion in the axial direction 51 (i.e. into the sheet plane).

This property of the first component 11 is achieved in that the latter is formed from a plurality of layers 30, 31, 32, 33 from different composites, in particular fiber composites, with different thermal expansion coefficients. Here, the layers 30, 31, 32, 33 are arranged in such a manner relative to each other and/or connected to each other that the thermal expansion takes place in the desired circumferential direction 50 and does not take place in the undesired axial direction 51. Through the selection of the material, the arrangement of the layers relative to each other, and the type of connection of the layers, it is also possible, when heated, to determine the extent of the thermal expansion of the first component 11 in the circumferential direction.

In one exemplary embodiment, the layer structure of the first component 11 is schematically illustrated in FIG. 2, which structure, in an exploded illustration, comprises four layers 30, 31, 32, 33 arranged on top of each other. Here, the layers 30, 33 are carbon fiber reinforced plastic CFP, wherein the orientation of the fibers 34, 37 contained therein takes place in the same direction. CFP designates a fiber plastic composite in which the carbon fibers, mostly in a plurality of layers, are embedded as reinforcement in a plastic matrix. Between the layers 30, 33, two layers 31, 32 of glass fiber reinforced plastic GFP are arranged, the fibers of which are arranged at an angle of 90° with respect to the fibers 34, 37 of the layers 30, 33. GFP is a fiber plastic composite made from a plastic (e.g. polyester resin, epoxy resin, or polyamide) and glass fibers.

The layer structure for the first component 11 shown in FIG. 2 results in a material which, due to the selection of different materials and the specific arrangement of materials in a layered structure or laminate structure, has different thermal expansions in the direction of the fibers 34, 37 or 35, 36. In contrast to this, a material that has thermal expansion coefficients which are identical in all directions such as, e.g. a CFP laminate with a quasi-isotropic structure, has a thermal expansion which is identical in all directions. Such a material can be used, for example, for the second component 12 of the device 10.

Due to the suitable material selection and/or the design of the first component 11, under the influence of temperature, the result for the component is a thermal expansion in the circumferential direction 50. However, a temperature expansion in the axial direction 51 by the first component does not take place. Due to the fact that when heated, the second component 12 has an identical heat expansion in the circumferential and axial directions 50, 51, the workpiece 20 is molded between the first and the second component 11, 12, wherein a movement in the axial direction does not take place. Accordingly, the quality of the workpiece 20 with regard to its fiber orientation and dimensional stability can be improved over conventional devices.

By using a device with directed heat expansion, it is possible during manufacturing to mold workpieces made from fiber reinforced composites in a certain direction. Thus, forces or relative displacements in another undesired direction can be avoided, which otherwise would cause an impairment of the workpiece to be manufactured, e.g. by fiber warpage. Moreover, a device according the invention has the advantage that manufacturing and demolding of certain geometries is possible which is not possible with conventional devices, the components of which have an identical thermal expansion in all directions.

The device 10 according to the invention illustrated in FIG. 1 has, only as an example, a cylindrical shape. The device comprising the first and the second components 11, 12 can have principally any shape for shaping a workpiece.

Also, the sequence of layers of a plurality of layers from different fiber reinforced composites shown in FIG. 2 is only an example. It is also possible to use a different number of layers for providing the first and/or second component 11, 12. Likewise, a different number of layers of carbon fiber reinforced plastics and glass fiber reinforced plastics can be used. Moreover, the arrangement of the layers of carbon fiber reinforced plastics and glass fiber reinforced plastics can be implemented in a different manner.

The 90° orientation of the fibers of the layers consisting of carbon reinforced plastics shown in FIG. 2 is also only exemplary. The fibers can also be oriented with respect to each other at an angle different from 90°. The orientation of the fibers depends on the directions in which a thermal expansion has to take place and in which directions said expansion has to be prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST

10 Device
11 First component
12 Second component
13 Outer circumferential surface of the first component
14 Inner circumferential surface of the second component
20 Workpiece
30 Layer of a fiber reinforced composite
31 Layer of a fiber reinforced composite
32 Layer of a fiber reinforced composite
33 Layer of a fiber reinforced composite
34 Fibers of the layer 30
35 Fibers of the layer 31
36 Fibers of the layer 32
37 Fibers of the layer 33
50 Circumferential direction
51 Axial direction

The invention claimed is:

1. A device for shaping a workpiece, the device comprising:
    a first component; and
    a second component, wherein, the first and second components of the device are arranged concentrically to each other,
    wherein between the first and second component the workpiece is arranged for molding while heated, and
    wherein a configuration and material properties of the first or second components is selected such that thermal expansion of the first or second component is different in different directions,
    wherein the first or second component, which has a different thermal expansion in different directions, comprises at least one layer of carbon fiber reinforced plastic arranged on top of at least one layer of glass fiber reinforced plastic,
    wherein fibers of the at least one layer of carbon fiber reinforced plastic and fibers of the at least one layer of glass fiber reinforced plastic are not oriented parallel to each other,
    wherein the layer of carbon reinforced plastic and the layer of glass fiber reinforced plastic are arranged in such a manner relative to each other that the thermal expansion takes place in the circumferential direction and does not take place in the axial direction of the first component, and
    wherein the first or second component has a sandwich structure in which two layers of glass fiber reinforced plastic are arranged between two layers of carbon reinforced plastic.

2. The device according to claim 1, wherein the fibers of the at least one layer of carbon fiber reinforced plastic and the fibers of the at least one layer of glass fiber reinforced plastic are oriented to each other at an angle of approximately 90°.

3. The device according to claim 1, wherein the first or second component, which has the different thermal expansion in different directions, comprises a second layer of carbon fiber reinforced plastic and a second layer of glass fiber reinforced plastic, wherein the at least one layer and the second layer of glass fiber are arranged adjacent to each other and between the at least one layer and the second layer of carbon fiber reinforced plastic, and wherein all layers are connected to each other in a firm bonding or form-locking manner.

4. The device according to claim 1, wherein the workpiece to be shaped is arranged between an outer circumferential surface of the first component and an inner circumferential surface of the second component, and wherein the configuration and the material properties of the first component are selected such that the thermal expansion of the first component is different in different directions and the second component has an identical thermal expansion in the different directions.

5. The device according to claim 4, wherein the first and second components are cylindrical.

6. The device according to claim 4, wherein, when heated, the first component has a thermal expansion in a circumferential direction.

7. The device according to claim 4, wherein, when heated, the first component has no thermal expansion in an axial direction.

8. The device according to claim 4, wherein the second component is a homogenous material or material composite.

9. The device according to claim 8, wherein, when heated, the second component has an approximately identical thermal expansion in a circumferential direction and an axial direction.

* * * * *